United States Patent
Finkeldei et al.

(10) Patent No.: US 6,763,852 B1
(45) Date of Patent: Jul. 20, 2004

(54) ALTERNATING DISTRIBUTOR FOR HIGH-VISCOSITY LIQUIDS

(75) Inventors: Ferdinand Finkeldei, Frankfurt am Main (DE); Walter Schnaus, Rodenbach (DE)

(73) Assignee: Lurgi Zimmer AG, Frankfurt am Main (DE)

( * ) Notice: Subject to any disclaimer, the term of this patent is extended or adjusted under 35 U.S.C. 154(b) by 0 days.

(21) Appl. No.: 10/018,833

(22) PCT Filed: Jun. 23, 2000

(86) PCT No.: PCT/EP00/05875

§ 371 (c)(1),
(2), (4) Date: Apr. 24, 2002

(87) PCT Pub. No.: WO01/00384

PCT Pub. Date: Jan. 4, 2001

(30) Foreign Application Priority Data

Jun. 24, 1999 (DE) ......................... 199 28 860

(51) Int. Cl.[7] ............................................. F16K 11/10
(52) U.S. Cl. ...................................... 137/883; 251/118
(58) Field of Search ........................... 137/883, 597, 137/240; 251/118

(56) References Cited

U.S. PATENT DOCUMENTS 4,066,097 A  1/1978  Fritsch ..................... 137/563
5,232,023 A * 8/1993  Zimmerly ................ 137/637.2
5,269,348 A  12/1993  Schnaus et al. ............. 137/883
5,499,652 A  3/1996  Schnaus et al. ............. 137/340
6,397,887 B1 * 6/2002  Crissman et al. ........... 137/597

FOREIGN PATENT DOCUMENTS

| DE | 196 49 013 A1 | 5/1998 | ............ B29B/13/10 |
| GB | 2 125 942 A | 3/1984 | ............. F16K/5/04 |
| JP | 05 063419 | 5/1977 | ............. D01D/1/06 |

OTHER PUBLICATIONS

Patent Abstracts of Japan, publication No. 03–168475, publication date Jul. 22, 1991 of application # 01–305806, application filing date Nov. 25, 1989 of Fuji Techno Kogyo KK.

* cited by examiner

*Primary Examiner*—John Fox
(74) *Attorney, Agent, or Firm*—Norris McLaughlin & Marcus PA

(57) ABSTRACT

An alternating distributor for high-viscosity liquids consisting of a product line I (2) which discharges in a central distribution chamber (1) having no surfaces and edges running perpendicularly to the flow of the product and for this purpose two product valves (3) in a Y-shaped arrangement each having a product line II (6) and optionally an auxiliary valve, characterized in that the valve blocks (8) of the product valves (3) have a mushroom-shaped displacer headpiece (11, 12) which when the valve is closed is positioned in the distribution chamber (1) and when the valve is open is positioned at the level of product line II (6).

11 Claims, 3 Drawing Sheets

ALTERNATING DISTRIBUTOR FOR HIGH-VISCOSITY LIQUIDS

This Application is a 371 of PCT/EP00/05875, filed Jun. 23, 2000.

The invention relates to an alternating distributor for high-viscosity liquids composed of a central distribution chamber (1) in which a product line I (2) and two product valves (3) discharge, characterised in that each of the product valves (3) consists of a housing (4) constructed as a guide cylinder having a laterally branching product line II(6) and a housing enlargement (5) on the side opposite the branching of product line II (6) together with a valve piston (7) with valve block (8) movable in the housing in the axial direction which in the closed position engages into a valve seat (9) inset into the wall of the central distribution chamber (1), and optionally an auxiliary valve (10). In particular, the invention relates to a device for the alternating distribution of polymer melt onto two alternately operated treatment units such as by way of example two polymer filters or processing extruder and granulator.

BACKGROUND OF THE INVENTION

Product distributors having a product supply line and at least two product valves, which may be operated simultaneously or alternately, are known (U.S. Pat. Nos. 5,269,348 and 5,499,652). Such product distributors should be free as far as possible of dead spaces since the prolonged dwell time of the product in such stagnant zones results in impairment of product quality and, in the case of polymers, in decomposition and cross-linking. Thus, the valves of the product distributor according to U.S. Pat. No. 5,269,348 have a housing enlarged on one side and constructed as a guide cylinder and a mushroom-shaped headpiece on the valve block which acting together give rise to uniform flow free of dead spaces inside the valve. In order to prevent cases of stagnation in the product line a portion of the product must be diverted and fed continuously to a collecting tank or the like. In the product distributor according to U.S. Pat. No. 5,499,652 the central distribution chamber is reduced to as small a volume as possible by a flow displacer. Both proposals are acceptable for product distributors in which all product valves are substantially constantly open but they are not adequate for alternating distributors in which one of the two product valves is always closed.

It is further known that filtration devices for polymer melt which have been taken out of operation can be cleaned with the aid of a stream of hot steam (DE 196 49 013 A).

SUMMARY OF THE INVENTION

The aim of the present invention is to modify an alternating distributor of the type specified at the outset in such a way that despite a constantly alternately closed product valve the product stream flows completely uniformly through the central distribution chamber and the second open product valve without formation of dead spaces, in particular in the distribution chamber. Furthermore, cases of decomposition or cross-linking of product residues in the valve closed at any time should be prevented as far as possible.

This task is solved according to the invention by an alternating distributor of the category identified at the outset which is characterised in that the two product valves (3) are in a Y-shaped arrangement relative to product line I (2), characterised in that the centre lines of the two product valves (3) run at an angle of 100 to 140° to one another and at an angle of 50 to 70° to the centre line of product line I (2), the valve block (8) possesses a mushroom-shaped displacer headpiece (11) which when the valve is closed is positioned fully in the central distribution chamber (1) with formation of a gap (i) relative to the wall of the distribution chamber allowing product flow and whose shaft (12) when the valve is open is positioned at the level of the branching of product line II (6), and the central distribution chamber (1) including the displacer headpiece (11) positioned in it possesses only surfaces and edges which run at an obtuse angle to the flow of product with exclusion of surfaces or edges arranged perpendicularly to the product flow.

DETAILED DESCRIPTION

Preferably in the region of the housing enlargement (5) the product valve housing (4) has a valve seat (13) in which the valve block of a valve piston of an auxiliary valve (10) in the closed position engages, said valve block being movable inside a housing constructed as a guide cylinder, characterised in that the housing of the auxiliary valve (10) is optionally connected to sealable lines (15) for venting and/or product discharge and/or for feeding in auxiliary agents such as air or nitrogen or steam.

The present invention distinguishes itself in that it avoids the disadvantages of normal changeover or alternating valves. The alternating distributor is far superior to the conventional valves. In order to obtain its present outstanding properties the alternating distributor was equipped according to the invention with the following special features.

In contrast with known distributors no surface or edge stands transversely at 90° to the direction of flow. In this way no jamming can arise at any surface which could prolong product dwell times. All angular positions of the housing walls along the flow path of the product are fixed in such a way that they always form an obtuse or acute angle and in this way no dead spaces can be produced in the flow path. There is no appreciable dead space due to the selected tolerances. The shaping of the housing and piston allows a dynamic flow which is able to sweep uniformly through the entire housing space. Despite the piston contours of the product valves there is a relatively small overall pressure loss in the distributor due to the enlargement of the valve housing at the necessary points.

In the present alternating distributor the piston and the valve seat are constructed in such a way that smooth, jolt-free opening flow characteristics result. The opening characteristics of the valve make it possible to design the distributors to be switched over fully automatically. Apart from the valve housing, the valve seat is a contributory cause of the smooth opening characteristics. Deliberately elongated opening cones in the housing of the distributor and the tolerances selected allow slow opening of the valve without a sudden pressure increase.

The mushroom-shaped displacer headpiece of the closed valve is set in such a way that it projects over the centre line into the opposite pipe space. In this way the mushroom head offers resistance to the straight, short product pathway and forces the main mass of product to slide along the longer path at the housing wall. The obtuse angles favour this product guidance. In this way a perfect flushing effect is produced. In order to reduce the relatively high pressure loss of the mushroom shaft and at the same time to exert an influence particularly favourable to flushing of the wall the diameter at the base of the shaft was reduced as far as possible. In this way the relatively large mushroom head shifts the flow further towards the base of the mushroom. This design feature also serves to improve the guidance of the product flow along the longer outside wall of the housing.

The housing was designed in such a way that the flow of polymer is guided. The pressure differences with the installed valve piston are devised in such a way that flushing of all corners and edges is ensured. The positioning of the product valves relative to one another is optimised in such a way that optimum flow without flow shadows is ensured for the flow of polymer through the distributor space. The angular positioning of preferably 120° relative to one another is an optimum with reference to the overall production of the distributor design. The range possible for the angular positioning is 100 to 140°.

The product valves can be equipped in inherently known manner with auxiliary valves for venting and/or discharging and/or feeding in auxiliary agents. The auxiliary valves are preferably arranged in such a way that after operation they can drain out. This is particularly advantageous when the high-viscosity liquid is a polymer melt which tends to carbonise. Tangential fitting of the auxiliary valve on the product valve is suitable in many cases.

The alternating distributor according to the invention can be used for any viscous liquid which is to be distributed from a single supply line alternately over two outlet lines of vice versa. A preferred application is the distribution of a polymer melt. Examples of such polymers are polyethylene terephthalate, polypropylene terephthalate, polybutylene terephthalate, polyamide 6, polyamide 6.6, polycarbonates, polyolefins and copolymers thereof. In this case the distributor and the polymer lines must be enclosed by one or more heating jackets in which a suitable heat transfer medium is circulating. Other types of heating, band heaters for example, may likewise be used.

Polymers exhibit the unpleasant property of decomposing in a hot pressureless space into low-viscosity and high-viscosity substances. While the low-viscosity products become gaseous over time and disappear into the atmosphere, the high-viscosity products carbonise. This formation of carbon results in the end in total blockage of the lines and valves. If a valve in the alternating distributor is shut off and not used for a relatively long period it is advisable to carry out a hydrolysis operation to clean the valve. The hydrolysis prevents carbonisation of the product in the valve. Before hydrolysis can be started the polymer has to be completely drained of polymer. The steam is not able to push the polymer out since it is preferably at a pressure of 1 to 2 bar absolute, and by particular preference 1.0 to 1.3 bar. The steam for hydrolysis is advantageously fed in via the auxiliary valves fitted in the base structure of the product valves. By this means hydrolysis can begin directly at the seat of the polymer valve. Care must be taken for the safe removal of the steam which may be laden with oligomeric hydrolysis products. Depending on whether the auxiliary valve or the product valve is subjected to hydrolytic cleaning the removal of the steam ensues via a venting nozzle on the auxiliary valve or via a corresponding emptying aperture in product line II.

The invention is discussed below in more detail with reference to drawings wherein:

BRIEF DESCRIPTION OF THE DRAWINGS

FIG. 1 shows an alternating distributor consisting of product line I (2) opening out into the central distribution chamber (1) and the two product valves (3) (not fully illustrated). Product lines II (6) are oriented downwards at up to 90°. The right-hand product valve (3) is shown in the closed position and the left-hand one in the open position of the valve. The product valves (3) themselves correspond to those of U.S. Pat. No. 5,269,348 with the exception of the geometry of the mushroom-shaped displacer headpiece (11). The housing (4) is enlarged (5) on the side opposite the branching of product line II (6) so that in the interplay of the enlargement (5) with the displacer headpiece (11) the main product flow is diverted and distributed uniformly over the entire cross section of the valve and hence over the entire cross section of the exit line (6). The valve piston (7) conveyed in the housing (4) carries the valve block (8) which in the closed position engages into the valve housing seat (9) with an elongated opening cone. The valve block (8) carries a mushroom-shaped displacer headpiece (11) described in greater detail in FIG. 3 which in the closed position of the valve is positioned completely in the distribution chamber (1), only a gap (i) sufficient for the product flow remaining between the displacer head (11) and the wall of the distribution chamber (1). When the valve is open the displacer head (11) is located as shown here at the level of the branching of product line II (6) in order there to exercise its blocking and distribution function.

FIG. 2 shows an alternating distributor of similar construction to that in FIG. 1. However, in the region of the housing enlargement (5) both product valves (3) are each connected to an auxiliary valve (10). Through the connecting piece (14) the auxiliary valve (10) can be heated with heat transfer liquid. If required, air or nitrogen or steam for hydrolysing polymer residues can be fed in via the connector (15).

FIG. 3 shows the geometry of the displacer headpiece (11) and its position inside the distribution chamber (1). The diameters of the valve piston (a), the valve seat (b), the shaft (c) and the mushroom head (d) of the displacer headpiece (11) are in the ratio a:b:c=1:(0.75 to 0.90):(0.4 to 0.5), with d=(0.90 to 0.99)*b.

The heights of the valve block (e), the shaft (f), the lower part (g) and the upper part (h) of the cap of the mushroom-shaped displacer headpiece (11) and the width (i) of the gap between the headpiece and wall when the valve is closed are in the ratio e:f:g:h:i=(0.6 to 0.8):(1.3 to 1.7):1:(0.95 to 1.05):(0.2 to 0.35), with d=(0.9 to 1.1)*(g+h), e+f+g=(1.0 to 1.05)*t and t is the diameter of product line II (6) at the branching point.

Figure 1:
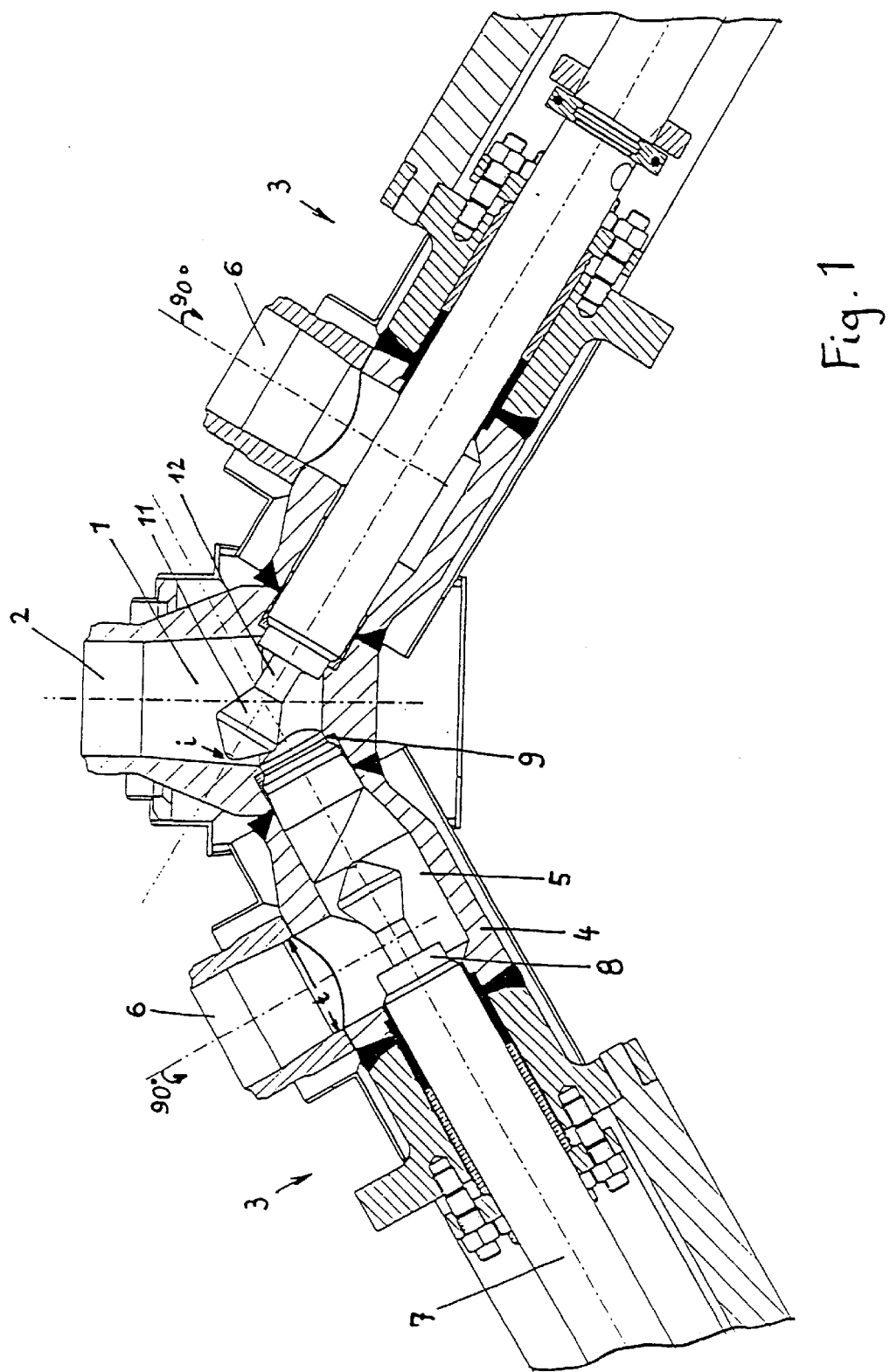
FIGS. 1 and 2 show an alternating distributor according to the invention without and with auxiliary valves respectively.
Figure 2:
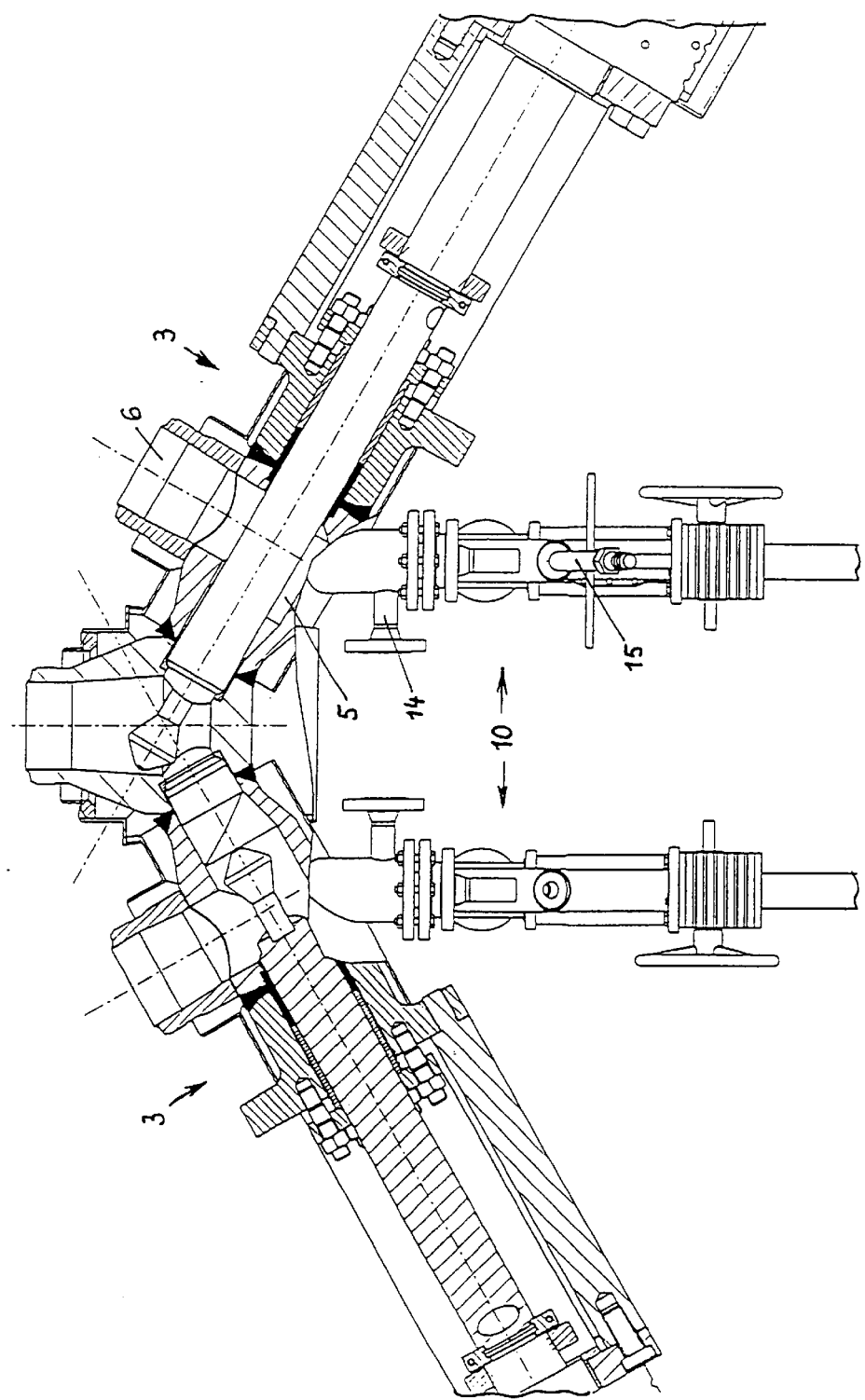
Figure 3:
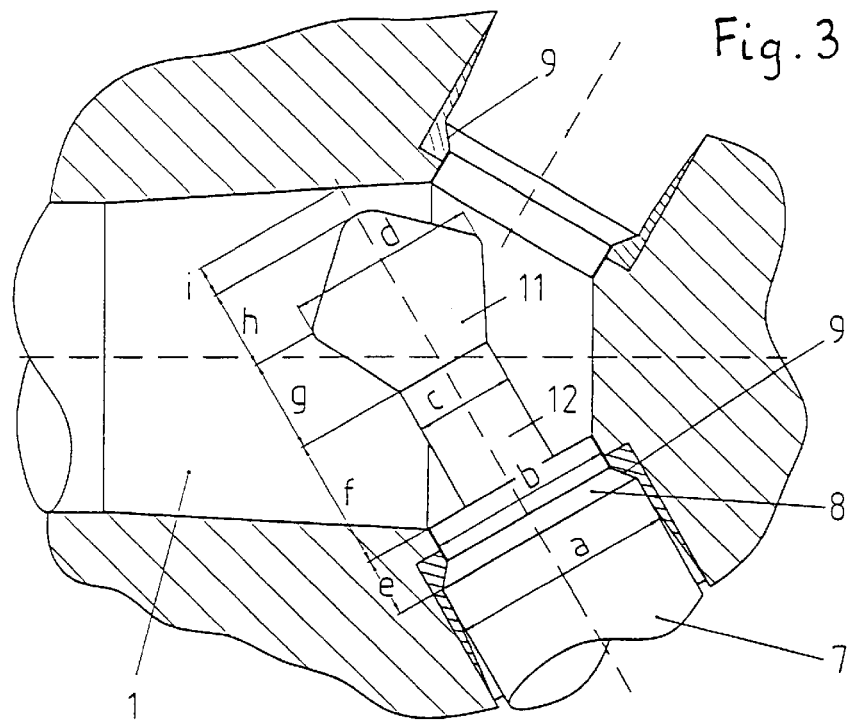
FIG. 3 the central distribution chamber with a closed and an open product valve.
Figure 4:
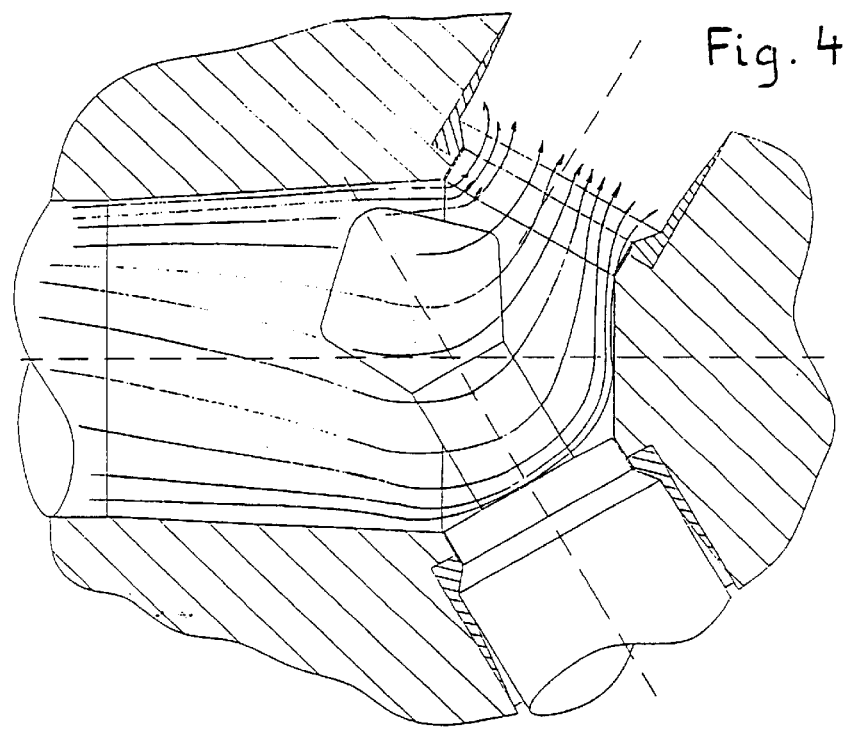
FIG. 4 the flow of product through the central distribution chamber of FIG. 3.

This geometry of the displacer headpiece (11) in association with the geometry of the distribution chamber (1) and the y-shaped arrangement of product line I (2) and product valves (3) brings about a uniform flow of product over the entire cross section as illustrated by arrows in FIG. 4. In particular, the distribution chamber (1) possesses no surfaces or edges running at right angles to the product flow, on the contrary all surfaces and edges run at an acute or obtuse angle to the product flow. The centre lines of the product valves (3) form an angle of 100 to 140°, preferably 120°, with one another and of 50 to 70° with the centre line of product line I (2). The product lines II (6) are preferably constructed with an orientation ranging from horizontal to vertically downwards at up to 90°.

What is claimed is:

1. An alternating distributor for high-viscosity liquids comprising a central distribution chamber, a product input line within said central distribution chamber and two product discharge valves communicating with said product input line, wherein each of the product discharge valves is comprised of a housing within which a guide cylinder having a laterally branching product discharge line and a housing enlargement on the side opposite the branching of the product discharge line are located, together with a valve piston having a valve block movable in the housing in the axial direction which, in the closed position, engages into a valve seat inset into the wall of the central distribution chamber, and optionally an auxiliary valve, said two product discharge valves being in a Y-shaped arrangement relative to the product input line wherein the center lines of the two product discharge valves run at an angle of 100 to 140° to one another and at an angle of 50 to 70° to the center line of the product input line, the valve block is provided with a mushroom-shaped displacer headpiece which, when the valve is dosed, is positioned fully within the central distribution chamber and forms a gap relative to the wall of the distribution chamber allowing product flow and having a shaft which, when the valve is open, is positioned at the location of the branching of the product discharge line, the central distribution chamber, including the displacer headpiece positioned in it possesses only surfaces and edges which run at an acute or obtuse angle to the flow of product with exclusion of surfaces or edges arranged perpendicularly to the product flow, the diameters of (a) the valve piston (b) the valve seat (c), the shaft and (d) the mushroom head of the displacer headpiece are in the ratio
a:b:c=1:(0.75 to 0.90):(0.4 to 0.5),
with d=(0.90 to 0.99)*b, and the heights of (e) the valve block (f), the shaft (g), the lower part and (h) the upper part of the cap of the mushroom-shaped displacer headpiece and (i) the width of the gap between the headpiece and wall when the valve is closed are in the ratio
e:f:g:h:i=(0.6 to 0.8):(1.3 to 1.7): 3:(0.95 to 1.06):(0.2 to 0.35), with d=(0.9 to 1.1)*(a+h),
e+f+g=(1.0 to 1.05)*t
and t is the diameter of product discharge line at the branching point.

2. The alternating distributor of claim 1, wherein the valve seat has an elongated opening cone.

3. The alternating distributor as claimed in claim 2, wherein, in the region of the housing enlargement the product valve housing is provided with a valve seat into which the valve block of a valve piston of an auxiliary valve in the closed position engages, said valve block being movable inside a housing constructed as a guide cylinder, wherein the auxiliary valve is optionally connected to sealable lines for venting and/or discharging and/or feeding in auxiliary agents.

4. The alternating distributor according to claim 2, wherein the alternating distributor and optionally the auxiliary valve are heated.

5. The alternating distributor as claimed in claim 1, wherein, in the region of the housing enlargement the product valve housing is provided with a valve seat into which the valve block of a valve piston of an auxiliary valve in the closed position engages, said valve block being movable inside a housing constructed as a guide cylinder, wherein the auxiliary valve is optionally connected to sealable lines for venting and/or discharging and/or feeding in auxiliary agents.

6. The alternating distributor as claimed in claim 1, wherein, in the region of the housing enlargement the product valve housing is provided with a valve seat into which the valve block of a valve piston of an auxiliary valve in the closed position engages, said valve block being movable inside a housing constructed as a guide cylinder, wherein the auxiliary valve is optionally connected to sealable lines for venting and/or discharging and/or feeding in auxiliary agents.

7. The alternating distributor as claimed in claim 6, wherein the auxiliary valve is connected to a line for feeding in gases or steam.

8. The alternating distributor as claimed in claim 7, wherein, when the auxiliary valve is open, the gases or the steam flow through the housing of the auxiliary valve and the housing of the product valve and exit via emptying apertures.

9. The alternating distributor according to claim 6, wherein the alternating distributor and optionally the auxiliary valve are heated.

10. The alternating distributor according to claim 1, wherein the alternating distributor and optionally the auxiliary valve are heated.

11. The alternating distributor as claimed in claim 1, wherein a high-viscosity liquid is optionally fed in via the product input line and carried away via the product discharge lines or fed in via the product discharge lines and carried away via the product input line.

* * * * *

UNITED STATES PATENT AND TRADEMARK OFFICE
CERTIFICATE OF CORRECTION

PATENT NO. : 6,763,852 B1
DATED : July 20, 2004
INVENTOR(S) : Finkeldei et al.

It is certified that error appears in the above-identified patent and that said Letters Patent is hereby corrected as shown below:

Column 5,
Line 31, "valve is dosed" should read -- valve is closed --
Line 54, "3 : (0.95 to 1.06):" should read -- 1 : (0.95 to 1.05): --

Column 6,
Line 1, "(a + h)" should read -- g + h --

Signed and Sealed this

Twenty-eighth Day of December, 2004

JON W. DUDAS
*Director of the United States Patent and Trademark Office*